United States Patent [19]

Kakinuma

[11] Patent Number: 4,728,181
[45] Date of Patent: Mar. 1, 1988

[54] SHOCK ABSORBING APPARATUS FOR A DOOR MIRROR OF AUTOMOBILES

[75] Inventor: Mikio Kakinuma, Tokyo, Japan

[73] Assignee: Niles Parts Co., Ltd., Tokyo, Japan

[21] Appl. No.: 758,459

[22] Filed: Jul. 24, 1985

[30] Foreign Application Priority Data

Jan. 22, 1985 [JP] Japan .................................. 60-8541
Apr. 24, 1985 [JP] Japan ........................... 60-61382[U]

[51] Int. Cl.⁴ ...................... B60R 1/06; F16C 11/12; G02B 7/18
[52] U.S. Cl. .................................. 350/632; 248/476; 248/479; 248/487; 248/900; 350/633; 350/637
[58] Field of Search ............... 248/476, 477, 479, 480, 248/486, 487, 478, 900, 289.3; 350/632, 633, 637, 639

[56] References Cited

U.S. PATENT DOCUMENTS

| | | | |
|---|---|---|---|
| 1,810,435 | 6/1931 | Paulson | 248/487 |
| 2,237,282 | 4/1941 | Reed | 248/487 |
| 3,367,616 | 2/1968 | Bausch et al. | 350/632 X |
| 4,213,675 | 7/1980 | Pilhall | 248/478 X |
| 4,256,375 | 3/1981 | Sharp | 350/637 |
| 4,277,140 | 7/1981 | Manzoni | 350/632 |
| 4,306,701 | 12/1981 | Nierhaus et al. | 248/479 |
| 4,444,466 | 4/1984 | Deshaw | 350/632 |
| 4,456,333 | 6/1984 | Hewitt | 350/637 |
| 4,512,633 | 4/1985 | Manzoni | 350/632 |
| 4,558,840 | 12/1985 | Manzoni | 248/900 X |

FOREIGN PATENT DOCUMENTS

| | | | |
|---|---|---|---|
| 139509 | 5/1985 | European Pat. Off. | 350/632 |
| 3248759 | 7/1984 | Fed. Rep. of Germany | 350/632 |
| 75343 | 5/1984 | Japan | |

Primary Examiner—John Petrakes
Attorney, Agent, or Firm—Ronald P. Kananen

[57] ABSTRACT

A shock absorbing apparatus for a door mirror of automobiles capable of absorbing a shock applied to the door mirror when a pedestrian or the like strikes the door mirror, by automatically rotating the door mirror; comprising an inner cylinder rotatably mounted on a supporting axis, and outer cylinder into which the inner cylinder can be received, and a shock absorbing member disposed between the inner cylinder and the outer cylinder, and fixed to the inner and outer cylinders respectively, the inner cylinder having a longer length in the axial direction than that of the outer cylinder, the supporting axis being disposed between upper and lower flanges mounted on either a door or a mirror case, both ends of the inner cylinder being fastened by the upper and lower flanges, and the outer cylinder being connected to the other provided with no flange.

7 Claims, 12 Drawing Figures

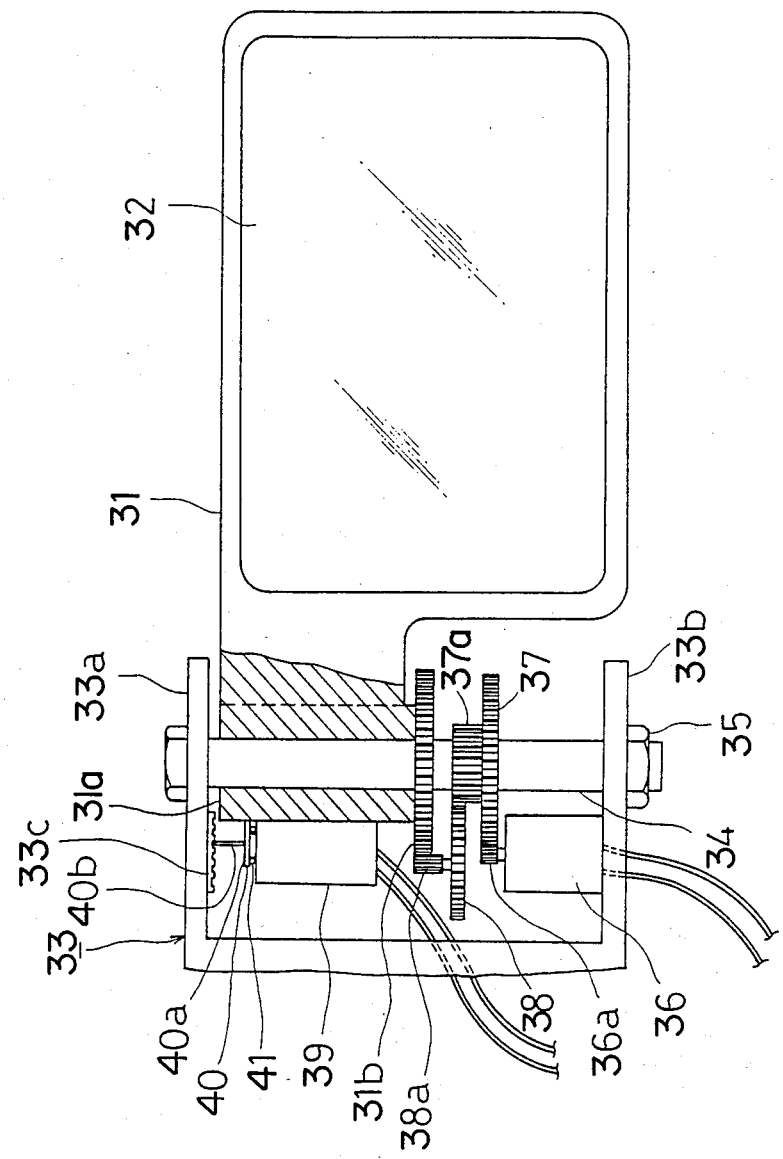

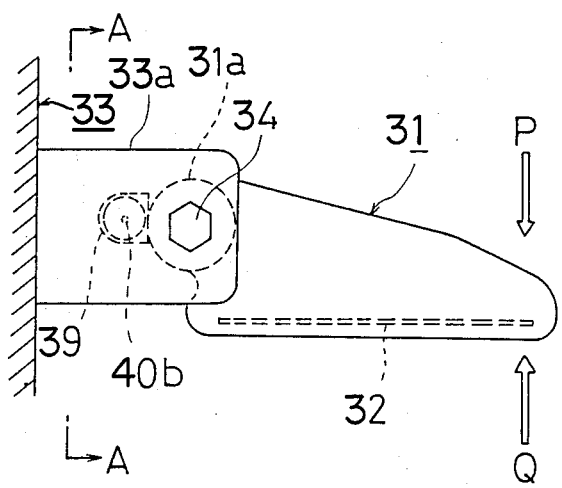
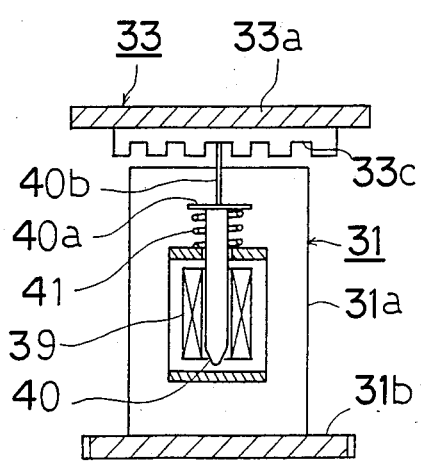
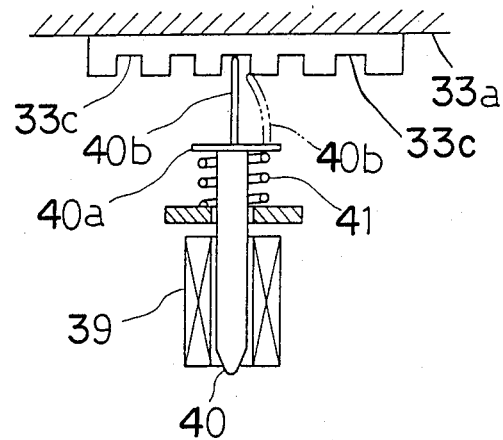

SHOCK ABSORBING APPARATUS FOR A DOOR MIRROR OF AUTOMOBILES

BACKGROUND OF THE INVENTION

1. Field of the Invention

The present invention relates to a shock absorbing apparatus for a door mirror of an automobile for absorbing the shock applied to the mirror case by rotating the mirror case, when an external object such as a pedestrian strikes a door mirror or an automatically controlled door mirror of a vehicle, especially a automobile.

2. Description of the Prior Art

Hitherto, a conventional outside mirror is constructed such that the mirror can incline or rotate for the safety of pedestrians even when a pedestrian touches the outside mirror of an automobile running on a road, thereby protecting the pedestrian from any wound due to the outside mirror. According to conventional outside mirrors of the rotation type and the fall type, generally referred to as the shock absorbing type outside mirror, the upper portion positioning other than the base portion of the outside mirror is moved from the outside of the automobile toward the inside thereof, when a load of about 20 Kg is applied to the outside mirror from the front portion of the automobile. Further, there has been provided a remote-controlled door mirror in which the mirror body thereof can be received within the automobile by being driven by an electric motor and the mirror surface can be freely and finely controlled by a driver in the automobile.

A shock absorbing apparatus of the conventional remote-controlled door mirror used for automobiles thus mentioned above is an expensive, complex mechanism.

SUMMARY OF THE INVENTION

The present invention is made for eliminating the above disadvantages of the conventional apparatus and presents a shock absorbing apparatus for a door mirror of vehicles comprising a supporting axis, an inner cylinder rotatably inserted into the supporting axis, an outer cylinder into which the inner cylinder is inserted, a resilient material disposed between the inner cylinder and the outer cylinder and fixed to both cylinders as a shock absorbing material, the inner cylinder extending in the direction of the supporting axis longer than the outer cylinder, the supporting axis being fixed between an upper flange and a lower flange disposed on one side of a door or a mirror case, both ends of the inner cylinder being pinched by the upper and lower flanges, and the outer cylinder being connected to the other side of the door or the mirror case.

According to the shock absorbing apparatus for a door mirror of vehicles of the present invention, the above-mentioned disadvantages of the conventional apparatus are resolved by such arrangement that the door mirror used for automobiles in which the door mirror case pivotably supported on a door body can be rotated by actuating an electric motor, is provided with an electromagnetic coil actuated upon the actuation of the electric motor, a plunger inserted in the electromagnetic coil and having a pin at the end point thereof, and a plurality of grooves formed on the door body for engaging the pin of the plunger.

BRIEF DESCRIPTION OF THE DRAWINGS

FIGS. 1 to 3 show a first embodiment of a shock absorbing apparatus for a door mirror of an automobile, according to the present invention wherein:

FIG. 1 is a side sectional view of a main portion of the first embodiment;

FIG. 2 is a plan view of the first embodiment; and

FIG. 3 is a sectional view taken along the line A—A in FIG. 1 in which the engagement between an upper flange and an arm is shown.

FIGS. 4 to 6 show a second embodiment of a shock absorbing apparatus for a door mirror of automobiles related to the present invention, wherein:

FIG. 4 is a side sectional view of a main portion of the second embodiment;

FIG. 5 is a perspective view showing the entire construction of the second embodiment; and FIG. 6 is a partially perspective view of the second embodiment showing an arm portion in the condition that a mirror case is moved.

FIGS. 7 and 8 show a third embodiment wherein:

FIG. 7 is a sectional view of a main portion in a third embodiment of the present invention;

FIG. 8 is a sectional view taken along the line C—C in FIG. 7;

FIGS. 9 to 12 show a fourth embodiment of a shock-absorbing apparatus for a door mirror according to the invention wherein:

FIG. 9 is a front view of a fourth embodiment of the present invention in which a main portion thereof is partially broken away;

FIG. 10 is a plan view of the fourth embodiment of the present invention;

FIG. 11 is a sectional view taken along the line A—A in FIG. 10; and

FIG. 12 is an enlarged view showing the operation of a pin in the fourth embodiment of the present invention.

DESCRIPTION OF THE PREFERRED EMBODIMENT

Figure 1:
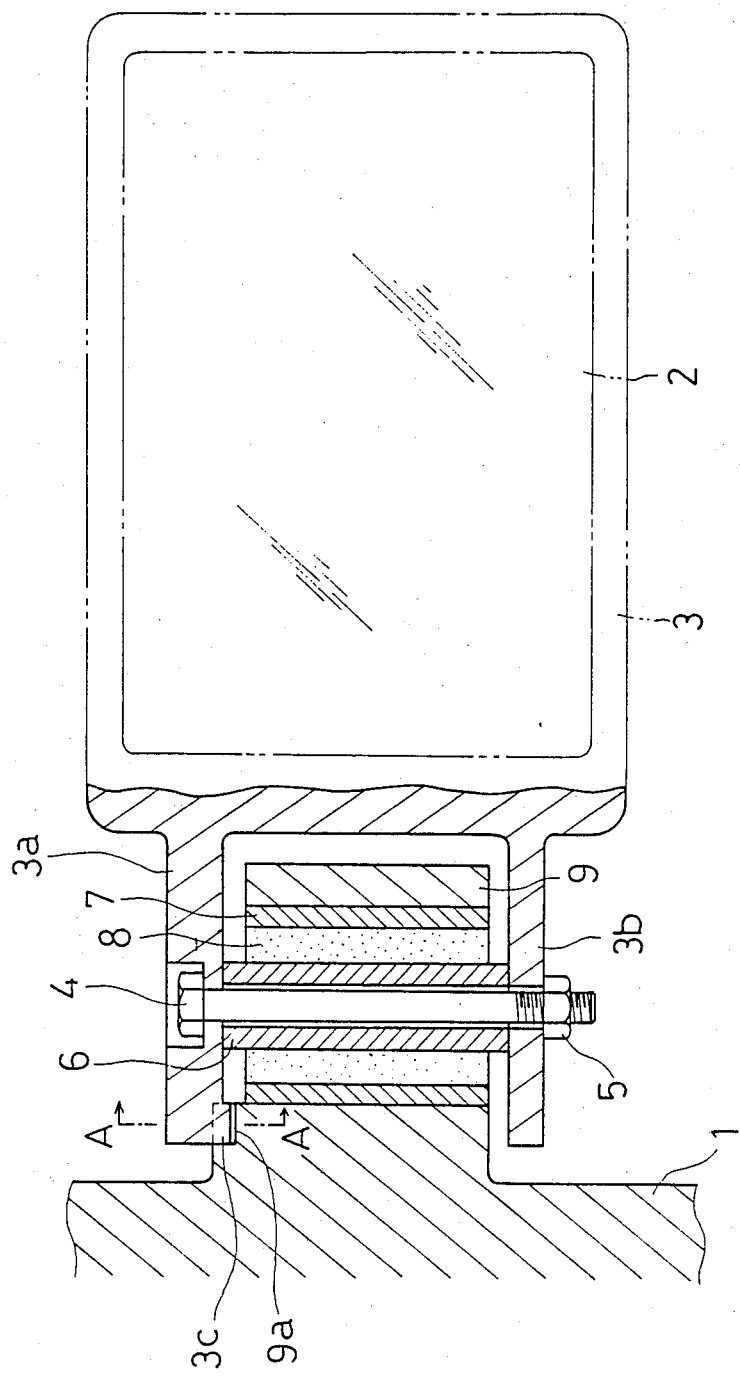
Figure 2:
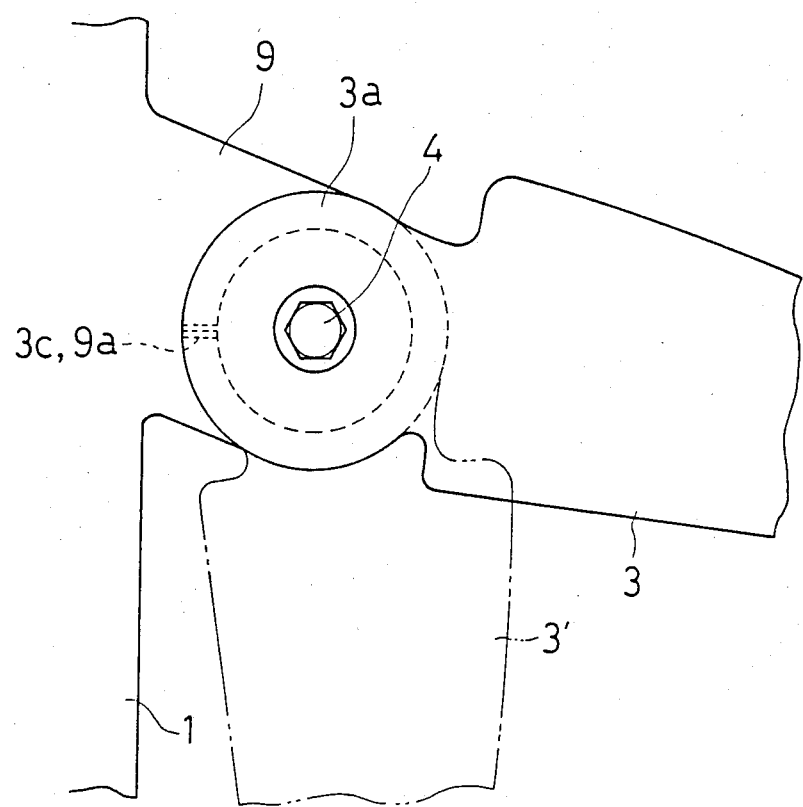
Figure 3:
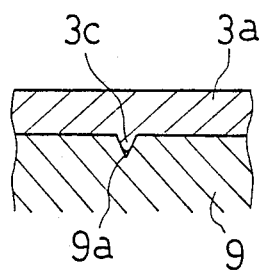

Referring to FIGS. 1 to 3, a first embodiment of the present invention is shown. A mirror 2 having a mirror case 3 with an upper flange 3a and a lower flange 3b is secured to a door 1 of a vehicle. The upper and lower flanges 3a and 3b extend from the mirror case 3 respectively. A bolt 4 is arranged to pass through the upper and lower flanges 3a and 3b, and engage a nut 5 to act as a supporting axis. An outer cylinder 7 includes an inner cylinder 6 therein. A shock absorbing member 8 is fixed to and disposed between the outer and inner cylinders 7,6. The inner cylinder 6 is adjacent to the bolt 4 rather than the shock absorbing member 8 and the outer cylinder 7, and both ends of the inner cylinder 6 are fastened between the upper and lower flanges 3a and 3b by the bolt 4 and the nut 5. An arm 9 extends from the door 1 and is fixed to the outer cylinder 7. A projection 3c formed on the lower surface of the upper flange 3a engages a groove 9a having a generally V-shaped section and formed on the upper surface of the arm 9. The mirror case 3 can be set at a normal position thereof by the engagement of the projection 3c and the groove 9a.

In operating the first embodiment of the present invention, the mirror case 3 is normally positioned as shown by the solid line in FIG. 2. In this condition, if the mirror case 3 is struck by an external object such as a pedestrian, the inner cylinder 6 is affected with the strike force to be rotated together with the upper and lower flanges 3a and 3b. However, since the outer cylinder 7 is fixed to the arm 9, the mirror case 3 can be rotated to the extent that the shock absorbing member 8 is movable due to its resiliency. Then, if the externally-applied rotating force is removed, the mirror case 3 returns again to the position shown by the solid line in FIG. 2 due to the resiliency of the shock absorbing member 8. The vibration of the vehicle generated during running of the vehicle is transmitted to the outer cylinder 7 through the arm 9 and then absorbed thereby, thus hardly transmitting the vibration to the inner cylinder 6. If the nut 5 is released, the inner cylinder 6 is also released from the fastening force of the upper and lower flanges 3a and 3b, so that the mirror case 3 may be movable from the normal position shown by the solid line to a voluntary position 3' shown by the dashed line.

In this embodiment, the arm 9 may be formed to share the function of the outer cylinder 7 without providing the outer cylinder 7.

Figure 4:
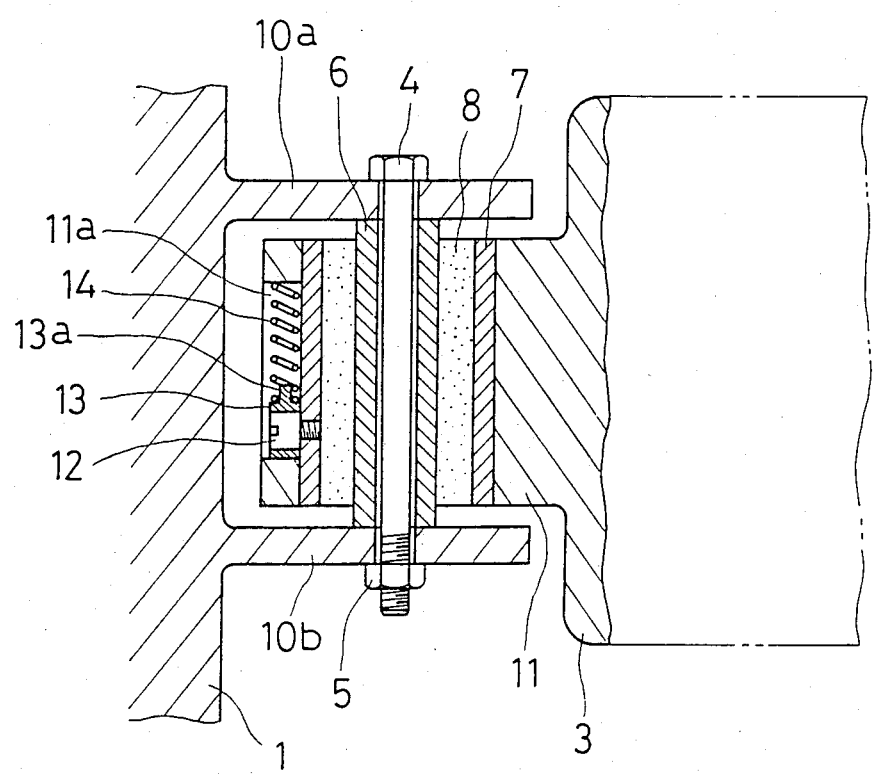
Figure 5:
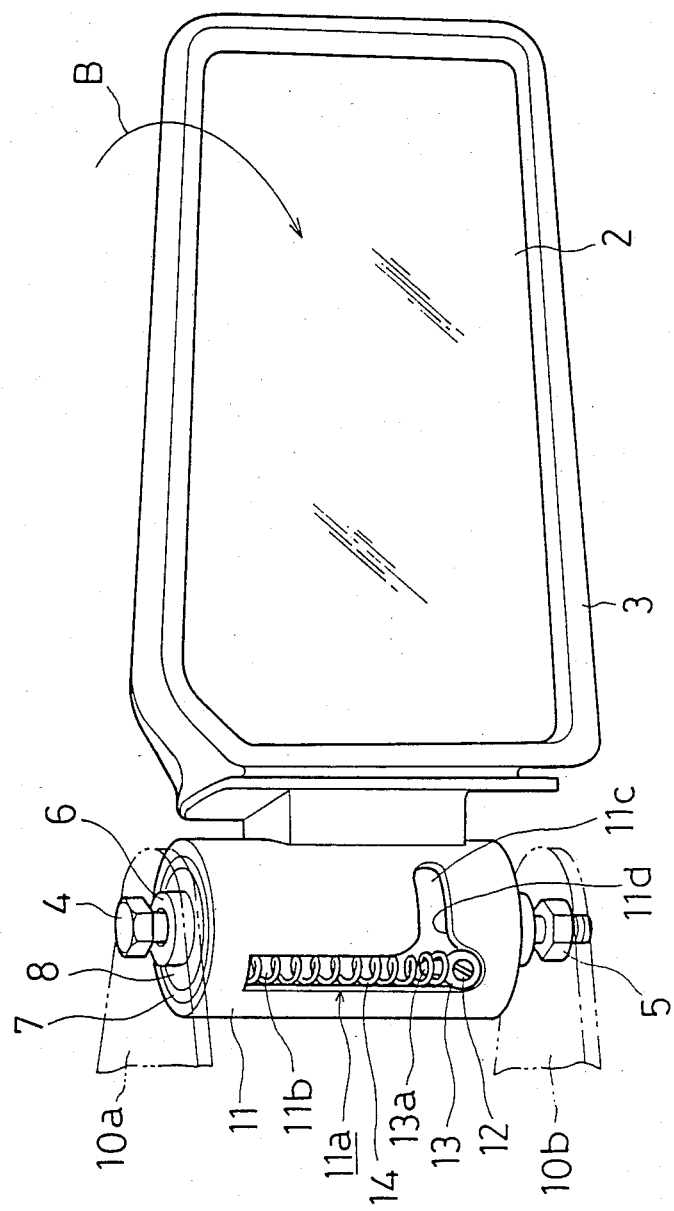
Figure 6:
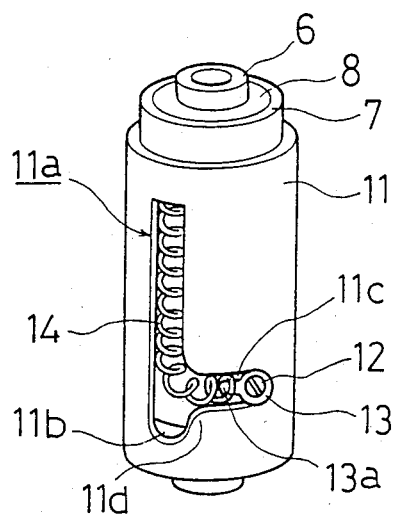

Referring to FIGS. 4 to 6, a second embodiment of the present invention is explained hereinafter.

The same members as discussed in connection with the first embodiment are denoted by the same reference numerals in FIGS. 1 to 3 and their explanation is omitted.

An upper flange 10a and a lower flange 10b respectively extend outwardly from the door 1. The bolt 4 is thus arranged to pass through the upper and lower flanges 10a, 10b. The ends of the inner cylinder 6 are fastened between the upper flange 10a and the lower flange 10b by the nut 5. An arm 11 extends from the mirror case 3. The arm 11 is rotatably mounted to the outer cylinder 7 and is slidable in the axial direction of the bolt 4. On the peripheral portion of the outer cylinder 7, there is provided a cylindrical pin 12 with a screw portion. As shown in FIG. 5, the arm 11 includes a slit portion 11a composed of a vertical slit 11b and a lateral 11c. A ring 13 provided in the vertical slit 11b is rotatably mounted on the pin 12 and has a projection 13a engaged to a coil spring 14. The coil spring 14 engages the projection 13a to bias the ring 13 toward the lower portion of the vertical slit 11b. The lateral slit 11c is connected to the vertical slit 11b at the lower portion of the slit portion 11a. There is provided a cam surface 11d in the slit portion 11a such that the ring 13 passes over the cam surface 11d when the ring 13 moves between the vertical slit 11b and the lateral slit 11c.

Referring now to the operation of the second embodiment of the present invention, the ring 13 mounted on the pin 12 is normally biased toward the lower portion of the vertical slit 11b by the resilient force of the coil spring 14. In this case, the coil spring 14 is affected with the static weight of the mirror case 3 and its accessory (not shown), a vibration of the vehicle, and a striking force due to an external object such as a pedestrian, through the arm 14; however, the resilient force of the coil spring 14 is predetermined such that the ring 13 does not exceed the cam surface 11d to displace to the lateral slit 11c under such forces.

In this condition, if the mirror case 3 is depressed downwardly against the resilient force of the coil spring 14 and rotated in the direction shown by the arrow line B in FIG. 5, the ring 13 passes over the cam surface 11d and moves into the lateral slit 11c as shown in FIG. 6. As a result, the mirror case 3 may be inclined for positioning the mirror case 3 at a desired position toward the door side by the extent allowed by the length of the lateral slit 11c.

Figure 7:
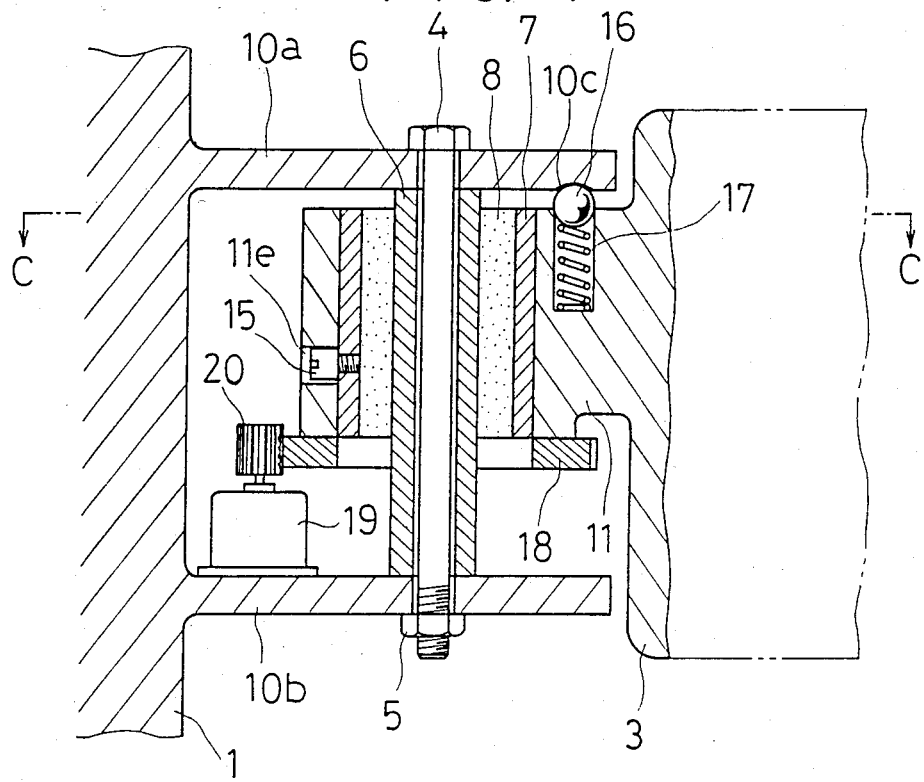
Figure 8:
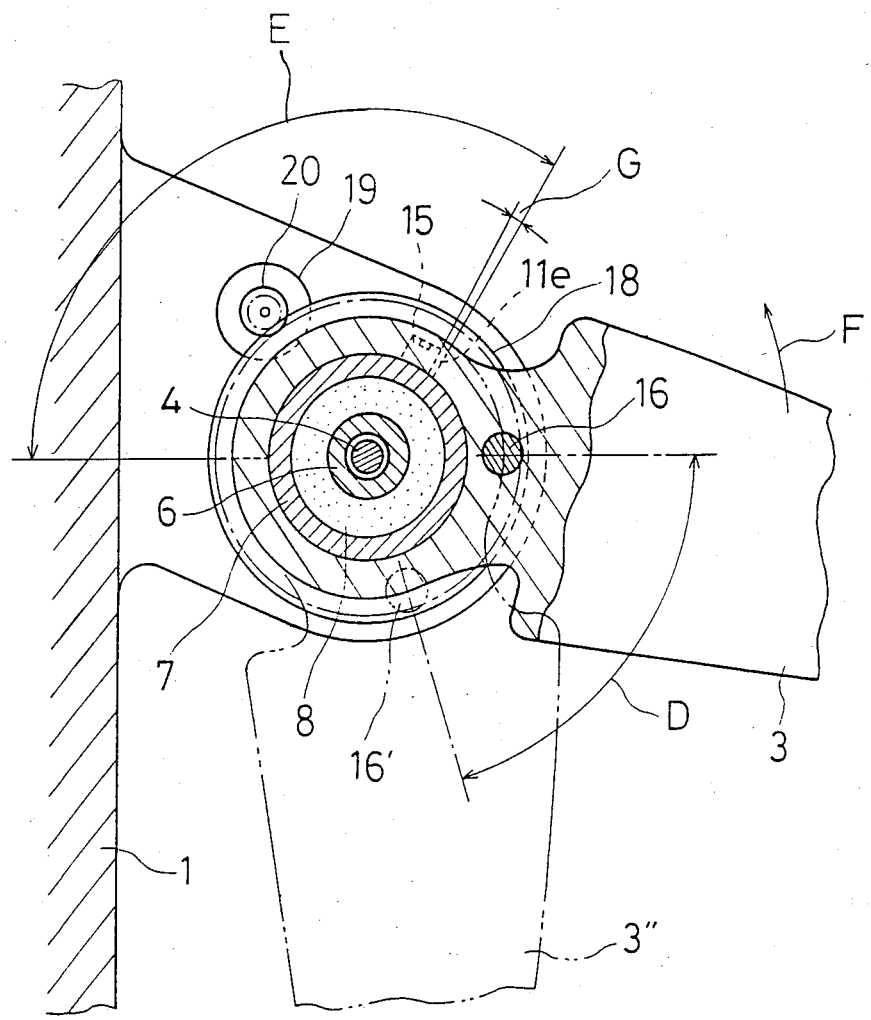

Referring now to FIGS. 7 and 8, a third embodiment of the present invention is explained hereinafter. The same members as that of the second embodiment are denoted by the same reference numerals as that in FIGS. 2 to 4 and their explanation is omitted. The arm 11 is mounted on the outer cylinder 7 rotatably and slidably in the axial direction of the bolt 4. At the peripheral surface of the outer cylinder 7, a cylindrical pin 15 is screwed. A lateral slit 11e is provided in the arm 11 for receiving the pin 15. A hole is provided for receiving a coil spring 17 energizing a ball 16 against a recessed portion 10c mounted on the lower surface of the upper flange 10a. At the lower surface of the arm 11, a gear wheel 18 is fixed. An electric motor 19 is mounted on the lower flange 10b for driving the gear wheel 18 through a pinion 20 fixed on the rotation axis of the electric motor 19, thereby rotating the mirror case 3. The opening angle E of the lateral slit 11e formed on the arm 11 is set such that the mirror case 3 can be rotated within the moving region D from the position shown by the solid line to the position 3" shown by the broken line in FIG. 8. The opening angle E of the lateral slit 11e may be increased by a small angle G so that when the mirror case 3 is affected with an external force in the direction F as shown in FIG. 8, the mirror case 3 can be further rotated in order to absorb the external force, thereby protecting the mirror case 3. Furthermore, it is possible to provide a recessed portion 16' on the upper flange 10a such that the ball 16 can be received at the boundary position 16' within the moving region D.

Referring to the operation of the third embodiment of the present invention, the mirror case 3 is normally located at the position shown by the solid line of FIG. 8. However, the mirror case 3 can be voluntarily moved at a desired position within the moving region D by driving the electric motor 19 forwardly or backwardly by utilizing a remote controlling means.

In each of the embodiments mentioned above, the upper and lower flanges may be provided on either the door 1 or the mirror case 3; the bolt 4 as a supporting axis may be provided between the upper and lower flanges, and the outer cylinder 7 may be connected to the outer side having no flange.

As mentioned above, a main feature of the present invention resides in that when the mirror case 3 is in the normal position thereof, a vehicle's vibration and an external shock to be applied to the mirror case 3 is effectivly absorbed by the resilient force of the shock absorbing member 8 arranged between the outer cylinder 7 and the inner cylinder 6. The nut 5 as mentioned in the above embodiments may be a wing nut so that the fastening operation can be effected without any tool.

According to the present invention a shock absorbing apparatus for a door mirror with a low cost and a simple construction by utilizing resilient deformation of a shock absorbing member composed of resilient material, is presented.

Referring now to FIGS. 9 to 12, a fourth embodiment is explained hereinafter.

Numeral 31 denotes a mirror case receiving a mirror 32 and supported by brackets 33a and 33b integrally formed with and projected from a door body 33. Numeral 31a denotes a bearing cylinder portion of the mirror case 31 to be inserted with a rotation bolt 34 as a rotational axis, and there is provided a gear portion 31b at the lower portion of the bearing cylinder portion 31a. The rotation bolt 34 is secured on the brackets 33a and 33b of the door body 33 by using a nut 35. Numeral 36 denotes an electric motor connected to a control switch (not shown) for driving the mirror case 31 projected from the door body 33 to be rotated toward the vehicle's body. Numeral 36a is a pinion fixed on the shaft of the electric motor 36 for engaging a first gear 37. The first gear 37 is fixed to a first transmission gear 37a engaging a second gear 38. The second gear 38 is fixed to a second transmission gear 38a engaging the gear portion 31b acting with the mirror case 31 in a body. Numeral 39 denotes an electromagnetic coil mounted on the bearing cylinder portion 1a of the mirror case 31 and pulling a plunger 40 provided within the electromagnetic coil 39 is connected to the control switch. The plunger 40 has a spring stopper 40a at the upper portion and a pin 40b at the upmost portion. The end point of the pin 40b is engaged with pressure to plural grooves 33c having a tooth shape which are provided on the inner surface of the bracket 33a. The pin 40b may be made of a metal with resiliency or the like. Numeral 41 denotes a compressing coil spring pressed to the spring stopper 40a thereby pressing the end point of the pin 40b to the groove 33c.

Referring to the operation of the fourth embodiment of the present invention, upon actuating the control switch a current flows into the electric motor 36 and the electromagnetic coil 39 thereby energizing the electric motor 36 and rotating the pinion 36a. By the rotation of the pinion 36a, the first gear 37 and the first transmission gear 37a are rotated. By the rotation of the first transmission gear 37a the second gear 38 engaged to the first transmission gear 37a and the second transmission gear 38a are rotated. By the rotation of the second transmission gear 38a, the gear portion 31b engaged to the second transmission gear 38a is rotated thereby rotating the mirror case 31 integrally formed with the gear portion 31b. The current for the electromagnetic coil 39 flows simultaneously upon the actuation of the electric motor 36, the plunger 40 is pulled due to the magnetic force, and then the pin 40b is released from the groove 33c of the bracket 33a. By the release of the pin 40b the rotation of the mirror case 31 is effected smoothly without any resistance. In accordance with the operation of the control switch, if a current flows in reverse into the electric motor 36, the mirror case also rotates in the reverse direction.

In the condition that the mirror case 31 is located in the normal position thereof and the control switch is in its OFF state, if the mirror case 31 is affected with an external force in the direction shown by the arrow P or an external force above about 10 Kg in the direction shown by the arrow Q, since no current flows into the electromagnetic coil 39, the plunger 40 is pressed by the coil spring 41 and the end point of the pin 40b is engaged with the groove 33c with pressure. Therefore, the mirror case 1 is rotated by bending the pin 40b thereby to remove it from the groove 33c. When the electric motor 36 is stopped, the mirror case 31 is fixed by the engagement between the pin 40b and the groove 33c. However, if the mirror case 31 is affected with the external force in the direction of P or Q, the mirror case 31 is rotated against a resistance force for preventing the rotation of the mirror case 31. The resistance force to the mirror case 31 can be suitably set in accordance with a length, a sectional diameter, a material of the pin 40b and a depth, a width, and a formation of the groove 33c.

According to the fourth embodiment of the shock absorbing apparatus for a door mirror of automobiles, there are provided an electromagnetic coil actuated upon actuating the electric motor, a plunger provided within the electromagnetic coil and having a pin at the end point of the plunger, and plural grooves to be engaged with the pin, whereby the door mirror can be rotated upon the application of the external force to the mirror case 31 by the fact that the pin is bending and removing from the groove, thereby preventing a pedestrian or the like from a wound. Further, an electric power source for the electric motor can be commonly used for the actuation of the plunger, so that the construction of the shock absorbing apparatus may be simple and the door mirror can be rotated suitably.

While the present invention has been particularly described with reference to specific embodiments thereof, it is to be understood that the words which have been used are words of description rather than limitation and that changes may be made within the purview of the appended claims without departing from the true scope and spirit of the present invention in its broader aspects.

What I claim is:

1. A shock absorbing apparatus for a door mirror of an automobile comprising:
   an outer cylinder;
   an inner cylinder rotatably mounted about a supporting axis and disposed within said outer cylinder, said inner cylinder having a length which is longer in the axial direction than that of said outer cylinder;
   an upper flange and a lower flange respectively mounted on either one of a door or a mirror case for defining said axis between said upper flange and said lower flange, the opposed ends of said inner cylinder being fastened to said upper and lower flanges;
   a shock absorbing member fixed to and disposed between the outer and inner cylinders; and
   means for biasing the mirror case to a normal position so that upon impact to the mirror case rotation of the mirror case occurs to the extent that the shock absorbing member is movable due to its resiliency.

2. The apparatus as set forth in claim 1 further including a bolt engaging said upper flange and said lower flange along said axis and a nut secured to said bolt for securing said inner cylinder between said upper and lower flanges so that by releasing said nut, the mirror case is movable from a normal position to another position.

3. The apparatus as set forth in claim 1 further including an arm extending from said mirror case and rotatably mounted to said outer cylinder, said arm being slidable in the axial direction, said outer cylinder providing at its peripheral portion a cylindrical pin with a screw portion.

4. The apparatus as set forth in claim 3 wherein said arm includes a slit portion having a vertcal slit having an end and a lateral slit; a ring is provided in said vertical slit and is rotatably mounted on said cylindrical pin, said ring defining a projection; and a spring member is positioned in said vertical slit in engagement with said projection to bias the ring toward the end of the vertical slit.

5. The apparatus as set forth in claim 4 wherein said slit portion includes a cam surface for engaging said ring when said ring moves between said vertical slit and said lateral slit.

6. The apparatus as set forth in claim 3 wherein said arm is rotatably and slidably mounted in the axial direction on said outer cylinder, said arm including a lateral slit, said slit receiving said cylindrical pin; and said arm defines an opening, a coil spring is positioned in said opening, and a ball is positioned between and in engagement with said spring and one of said flanges.

7. The apparatus as set forth in claim 1, wherein the upper flange and lower flange are mounted on the mirror case, the upper flange having a lower surface, the apparatus further comprising:
- an arm extending from the door, the outer cylinder being fixed to said arm;
- a projection formed on the lower surface of the upper flange; and
- a groove defined in said arm for engaging the projection, the normal position of the mirror case being set by engagement of the projection and the groove.

* * * * *